April 28, 1964  W. E. SPRINGER  3,131,044
FILTER BAG AND SUSPENSION FOR DUST COLLECTING APPARATUS
Filed May 25, 1962  2 Sheets-Sheet 1

INVENTOR.
WILLIAM E. SPRINGER,
BY
ATTORNEYS.

April 28, 1964     W. E. SPRINGER     3,131,044
FILTER BAG AND SUSPENSION FOR DUST COLLECTING APPARATUS
Filed May 25, 1962     2 Sheets-Sheet 2

INVENTOR.
WILLIAM E. SPRINGER,
BY
ATTORNEYS.

United States Patent Office 3,131,044
Patented Apr. 28, 1964

3,131,044
FILTER BAG AND SUSPENSION FOR DUST
COLLECTING APPARATUS
William E. Springer, Springfield, Ohio, assignor to
Robbins & Myers, Inc., Springfield, Ohio, a corporation of Ohio
Filed May 25, 1962, Ser. No. 197,791
3 Claims. (Cl. 55—378)

This invention relates to filter bags and suspension means for filter bags such as are used in industrial dust collecting apparatus for example. In such an apparatus, dust laden air is drawn or forced through duct work into the apparatus by a suitable air moving device and is then caused to expand within the apparatus and pass at greatly reduced velocity through filter media. The particular filtering media to which the present invention relates comprise a plurality of bags or envelopes which are relatively long, deep and narrow and are supported in parallel side by side relation. The bags have open tops and means for keeping them open and the air is caused to pass from outside of the bags to the interior thereof into a plenum chamber where the air moving device may be located. The dust removed from the air is caught on the outside surfaces of the filter bags from which it can be periodically removed by shaking, brushing or other suitable means.

In such a dust collecting apparatus, it is desirable that the bags be readily removable for cleaning and replaceable in the event of damage or wear and it is, therefore, an object of the present invention to provide a mounting arrangement for such filter bags which seals the bags within the apparatus in such manner that all the air flowing through the apparatus is constrained to pass through the bag surfaces.

It is another object of the invention to provide a mounting for the bags such that the bags may be freed from sealing engagement and readily removed for cleaning or replacement. Other objects include the provision of novel filter bags and means for sealing them in their respective mountings.

These and other objects of the invention which will be described in more detail hereinafter or which will be apparent to one skilled in the art upon reading these specifications are accomplished by that certain construction and arrangement of parts of which the following is an exemplary embodiment.

Reference is made to the drawings forming a part hereof and in which.

Briefly, in the practice of the invention there is provided a frame secured in the apparatus housing and presenting inwardly extending horizontal flanges. The bags themselves are supported between a plurality of parallel spaced I-beam elements which are secured to transverse hanger elements having flanges adapted to extend over opposed horizontal flanges of said frame. Means are provided for securing a filter bag between each pair of the I-beam members, said bag members extending forwardly and rearwardly beyond said hanger members so that by raising the entire assembly relative to the horizontal flanges, the ends of the bags are sealed against a gasketing material on the undersides of the front and rear flanges.

Figure 1:
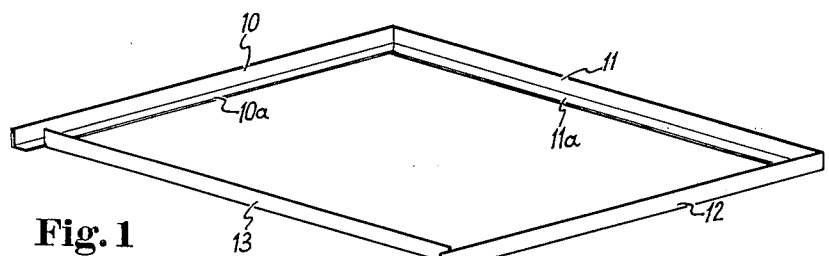
FIG. 1 is a perspective view of a mounting frame adapted to be secured within the dust collector housing.
Figure 2:
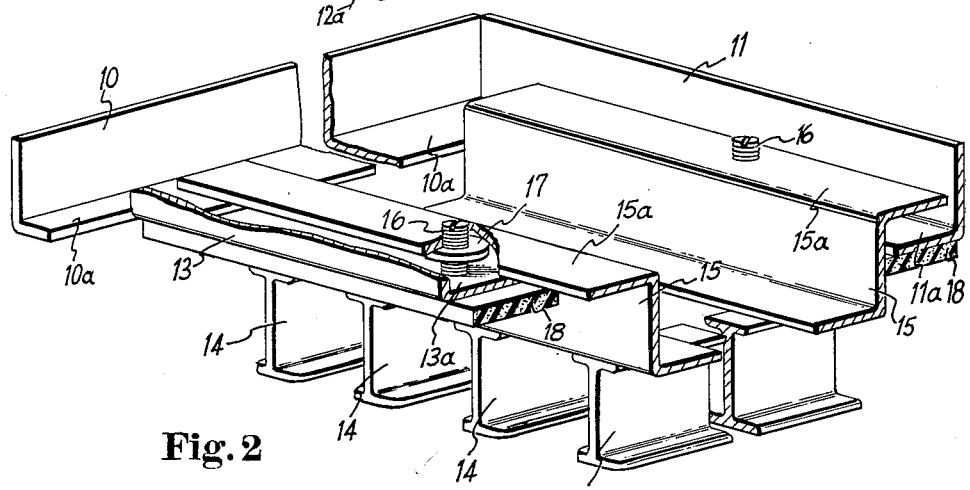
FIG. 2 is a fragmentary perspective view of the mounting assembly in place on said frame showing means for adjusting the mounting and sealing engagement.
Figure 3:
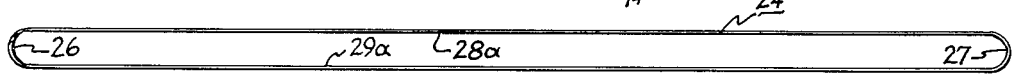
FIG. 3 is a plan view of a spring member incorporated in the upper edge of each bag in its configuration when in place in the mounting.

Referring now in more detail to the drawings, a frame composed of angle members 10, 11, 12 and 13 is shown in FIG. 1. This frame may be thought of as being secured in a horizontal plane in the inside of the housing of the apparatus. Each of the angle members has a horizontally inwardly projecting flange 10a, 11a, 12a and 13a, respectively.

The bag supporting members comprise the I-beam elements 14 which are arranged in spaced parallel relation and welded or otherwise suitably secured to the Z-shaped members 15 at the front and rear. The proportions of the parts are such that when the Z-shaped members 15 are secured to the members 14 at their ends, the upper flanges 15a of the Z-shaped members extend over the front and rear horizontal flanges 13a and 11a, respectively. Means are provided to adjust the height of the suspension and these means may be in the form of screws 16 engaging in nuts 17 welded or otherwise secured to flanges 15a. The lower ends of the screws 16 rest on the flanges 11a and 13a respectively, and it will be clear that by adjusting the screws 16 the assembly, including the two Z-shaped members 15 and their associated I-beams 14, can be raised or lowered with respect to the flanges 11a and 13a. Gasketing material 18 is cemented or otherwise suitably secured to the undersides of the flanges 11a and 13a for a purpose to be described hereinafter.

Figure 4:
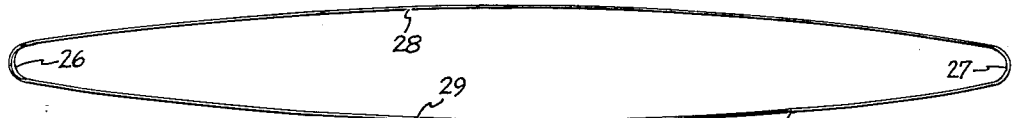
FIG. 4 is a view similar to FIG. 3 but showing the spring member in its free state.
Figure 5:
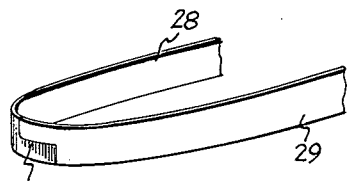
FIG. 5 is a fragmentary perspective view of one end of the spring member showing how the ends of the spring member may be joined.
Figure 6:
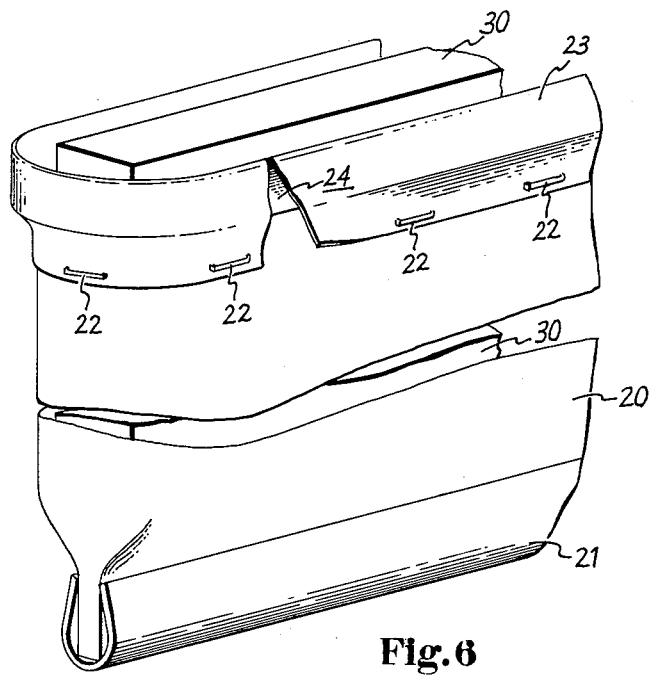
FIG. 6 is a perspective view of a filter bag with parts broken away to show the construction.

Coming now to a description of the filter bags themselves and the construction thereof and referring to FIGS. 3 to 6 inclusive, the bags themselves are illustrated at 20 and these are made of any suitable air permeable fabric material such as a closely woven cotton sateen. The bags are relatively long and deep and quite narrow, so that they may fit between the adjacent I-beam members 14 at their tops and hang down in their dust collector cabinet. At the bottom of the bags 20 are the horseshoe shaped clamp members 21, which add weight to the bottoms of the bags to keep their sides taut. At their upper ends the material of the bags is turned outwardly and downwardly to provide a hem secured by staples 22 or other suitable means. The hem 23 thus formed encloses and secures a spring member 24 shown in more detail in FIGS. 3 to 5 inclusive. The spring member is constituted of spring steel or other suitable resilient material which may be welded or otherwise suitably secured together at one end, as at 25 in FIG. 5. The spring member 24 has a free shape in plan view such as shown in FIG. 4 which consists essentially of the small radius semicircular end portions 26 and 27 and the relatively large radius curved portions 28 and 29. This particular configuration has been referred to hereinafter and in the claims as a "cigar shape." The diameter of the short radius portions 26 and 27 is substantially equal to the space between the webs of the I-beam members 14 and the spacing between the portions 28 and 29 is of course greater. When a member 24 is positioned endwise into the two opposed channels constituted by the adjacent I-beam members, it is constrained into the configuration shown in FIG. 3 in which the small radius end portions 26 and 27 substantially retain their original shape but in which the large radius curved portions 28 and 29 are flattened into parallel straight lines, as shown at 28a and 29a. It will be clear that when in place, the portions 28a and 29a bear outwardly against the webs of the adjacent I-beam members 14 to lock the filter bag frictionally in place. The spring members 24 are enclosed in the hem 23 referred to in connection with FIG. 6. In this way the sides of the individual filter bags are thoroughly sealed against their respective I-beam members. Since the air passes from outside the bag into the interior of the bag, there would be a tendency for the bag to collapse. This is prevented by a block 30 (FIG. 6) inserted into the respective bags and which prevents their collapse. The blocks 30 are of very air permeable material such as a very porous urethane foam or a matted fibrous block of horsehair or the like through which air can pass readily.

Figure 7:
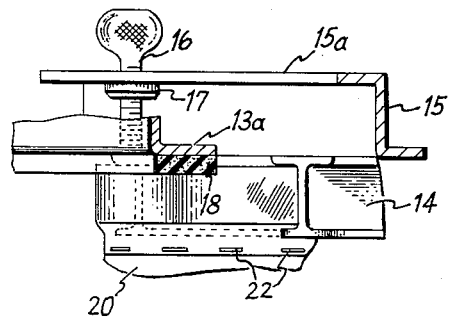
FIG. 7 is a fragmentary view similar to FIG. 2 showing a filter bag in place.

As best seen in FIG. 7, the ends of the tops of the filter bags extend forwardly and rearwardly beyond the ends of the members 14 thus coming under the respective flanges 11a and 13a and under the gasketing material 18. It will be clear that when the screws 16 are adjusted to raise the entire suspension, the ends of the filter bags will be sealed against the gasketing material 18.

Figure 8:
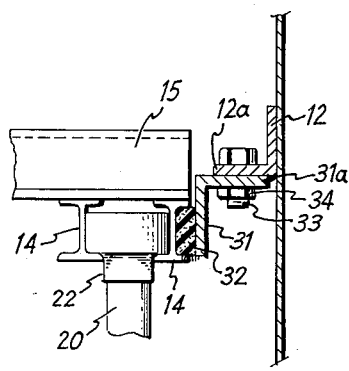
FIG. 8 is a fragmentary cross-sectional view showing how the sides of the suspension are sealed.

There remains then only the sealing of the outer sides of the outermost I-beam members 14 and this is accomplished as best seen in FIG. 8. Angle members 31 are secured to the horizontal flanges 10a and 12a at the sides of the apparatus, and bear against the gasket material 32 which is secured to the outermost I-beam members 14. Bolts 33 with nuts 34 secure the angle members 31 to the angle members 12a and 10a. Either the flanges 10a and 12a or the flanges 31a are provided with slots so that the angle member 31 may be adjusted in and out so as to press against the gasketing material 32.

It will now be understood that the frame as a whole is sealed by the gasketing material 32 at the two sides of the frame and by the gasketing material 18 at the front and back of the apparatus and that the filter bags themselves are sealed within the channels created by the adjacent I-beam members 14 by the spring action of the member 24.

It will be appreciated that when it is desired to clean or replace one or more of the filter bags, the screws 16 are rotated to drop the members 15 so as to free the filter bags from sealing engagement with the gaskets 18. The filter bags may then simply be pulled out for cleaning or replacement.

It will be understood that various modifications may be made without departing from the spirit of the invention and that there is no intention to restrict this application beyond the scope of the claims as hereinafter set forth.

The invention having now been fully described, what is claimed as new and what it is desired to secure by Letters Patent is:

1. A filter bag suspension for supporting a plurality of relatively long, deep and narrow filter bags in parallel spaced relation in a dust collecting apparatus having a front and back, said bags being disposed in parallel side by side relation with the individual bags extending from front to back of said apparatus; comprising a rectangular frame secured in said apparatus and presenting inwardly extending horizontal flanges, front and back hanger elements, bag supporting means secured to said front and back hanger elements, said hanger elements extending respectively over the front and back horizontal flanges, means associated with said hanger elements for adjusting the height at which said supporting means is suspended, gasketing means for the sides of said supporting means, said filter bags having means for securing them in sealing engagement with said supporting means and with portions extending forwardly and rearwardly under said front and back horizontal flanges, said adjusting means, upon raising the said supporting means with respect to said front and rear flanges, acting to press the forwardly and rearwardly extending portions of said bags into sealing engagement with the undersides of said front and back flanges.

2. A filter bag suspension according to claim 1, wherein said supporting means provides a plurality of bag top engaging slots and wherein said bag tops are provided with outwardly urging spring means to cause said bag tops to engage in said slots in sealing engagement.

3. A filter bag suspension for supporting a plurality of long, deep and narrow filter bags in parallel spaced relation in a dust collecting apparatus having a front and back, comprising a rectangular frame secured in said apparatus and presenting inwardly extending horizontal flanges, the said flanges in the front and back of said apparatus having on their undersides a sealing gasket, front and back hanger elements, a plurality of I-section bag supporting members secured in parallel spaced relation to said front and back hanger elements, said hanger elements extending respectively over said front and back flanges, means associated with said hanger elements for adjusting the height in which said bag supporting members are suspended, gasketing means for the outer surfaces of the two outermost bag supporting members, said gasketing means being adjustably secured to the flanges at the sides of said frame, said filter bags being open at the top and having means for holding said tops open between pairs of said bag supporting members, said tops extending forwardly and rearwardly beyond said bag supporting members under said front and back flanges, said adjusting means, upon raising said bag supporting members, pressing the forwardly and rearwardly extending bag tops against the sealing gaskets on the undersides of said front and back flanges.

References Cited in the file of this patent
UNITED STATES PATENTS

| | | |
|---|---|---|
| 540,856 | Dodge | June 11, 1895 |
| 1,881,086 | Marshall | Oct. 4, 1932 |
| 1,918,764 | Ljungquist | July 18, 1933 |
| 2,335,315 | Seymour | Nov. 30, 1943 |
| 2,936,854 | Lucas | May 17, 1960 |